US007144925B2

(12) United States Patent
Burgun et al.

(10) Patent No.: US 7,144,925 B2
(45) Date of Patent: Dec. 5, 2006

(54) FIRE RESISTANCE ACOUSTIC FOAM

(75) Inventors: Sandrine Burgun, Leutenheim (FR); Jonathan Kammerer, Ashland, KY (US); Chung P. Park, Waltham, MA (US); William G. Stobby, Midland, MI (US); Suresh Subramonian, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 61 days.

(21) Appl. No.: 10/476,438

(22) PCT Filed: May 9, 2002

(86) PCT No.: PCT/US02/14784

§ 371 (c)(1), (2), (4) Date: Oct. 30, 2003

(87) PCT Pub. No.: WO02/098963

PCT Pub. Date: Dec. 12, 2002

(65) Prior Publication Data

US 2004/0167240 A1    Aug. 26, 2004

(51) Int. Cl.
C08J 9/00        (2006.01)
(52) U.S. Cl. .............................. 521/79; 521/81; 521/92; 521/119; 521/123; 521/134; 521/139; 521/140
(58) Field of Classification Search ................. 521/81, 521/79, 134, 139, 140, 92, 119, 123
See application file for complete search history.

(56) References Cited

U.S. PATENT DOCUMENTS

| | | | |
|---|---|---|---|
| 3,188,295 A | 6/1965 | Ballast et al. ................. 260/2.5 |
| 3,250,731 A | 5/1966 | Buhl et al. ..................... 260/2.5 |
| 3,860,523 A | 1/1975 | Petrow et al. ................. 252/8.1 |
| 4,076,698 A | 2/1978 | Anderson et al. ......... 526/348.6 |
| 4,110,247 A | 8/1978 | Gower, II et al. ...... 252/313 R |
| 4,214,054 A | 7/1980 | Watanabe et al. ............. 521/95 |
| 4,277,569 A | 7/1981 | Walker ........................ 521/92 |
| 4,323,528 A | 4/1982 | Collins ........................ 264/53 |
| RE31,214 E | 4/1983 | Petrow et al. .............. 524/411 |
| 4,446,254 A | 5/1984 | Nakae et al. ................. 521/92 |
| 4,714,716 A | 12/1987 | Park ............................ 521/80 |
| 4,741,865 A | 5/1988 | Kintz et al. ................ 252/609 |
| 4,916,198 A | 4/1990 | Scheve et al. .............. 526/351 |
| 5,102,701 A | 4/1992 | Davis et al. ............. 427/393.3 |
| 5,171,757 A | 12/1992 | Stobby et al. ................ 521/85 |
| 5,182,048 A | 1/1993 | Kintz et al. ............. 252/363.5 |
| 5,306,742 A | 4/1994 | Kintz .......................... 523/200 |
| 5,366,675 A * | 11/1994 | Needham .................... 264/45.5 |
| 5,409,980 A | 4/1995 | Myszak, Jr. ................ 524/409 |
| 5,420,183 A | 5/1995 | Arena et al. ................ 524/120 |
| 5,424,016 A | 6/1995 | Kolosowski ................ 264/156 |
| 5,527,573 A | 6/1996 | Park et al. ................ 428/314.8 |
| 5,585,058 A | 12/1996 | Kolosowski ................ 264/156 |
| 5,650,448 A | 7/1997 | Wallace et al. ................ 521/82 |
| 5,800,740 A | 9/1998 | Catone ........................ 252/610 |
| 5,817,705 A | 10/1998 | Wilkes et al. ................. 521/79 |
| 5,874,024 A | 2/1999 | Knaus ........................ 252/356 |
| 5,993,707 A | 11/1999 | Chaudhary et al. ........... 264/53 |
| 6,040,371 A | 3/2000 | Catone ........................ 524/409 |
| 6,093,752 A | 7/2000 | Park et al. .................. 521/139 |
| 6,197,852 B1 | 3/2001 | Chun .......................... 524/93 |
| 6,251,319 B1 * | 6/2001 | Tusim et al. ................ 264/45.9 |
| 6,607,794 B1 * | 8/2003 | Wilson et al. ............. 428/34.1 |
| 6,720,363 B1 * | 4/2004 | Subramonian et al. ........ 521/81 |
| 2002/0006976 A1 | 1/2002 | Subramonian et al. ........ 521/79 |

FOREIGN PATENT DOCUMENTS

| | | |
|---|---|---|
| GB | 2145961 | 4/1985 |
| JP | 10-182869 | 7/1998 |
| JP | 10-204200 | 8/1998 |
| JP | 10-212369 | 8/1998 |
| JP | 11-335479 | 10/1999 |
| WO | 93/12163 | 6/1993 |
| WO | 97/18262 | 5/1997 |
| WO | 00/12593 | 3/2000 |
| WO | 00/15697 | 3/2000 |
| WO | 00/15700 | 3/2000 |
| WO | 00/64966 | 11/2000 |
| WO | 01/40366 A1 | 6/2001 |

OTHER PUBLICATIONS

NYACOL, Trademark of Nyacol Nano Technologies, Inc., Nano-Dispersible Dry Powder Colloidal Antimony Pentoxide Flame Retardant Additives, Technical Data Sheet.
NYACOL, Trademark of Nyacol Nano Technologies, Inc., Colloidal Antimony Pentoxide Flame Retardant Additives,Technical Data Sheet.

(Continued)

Primary Examiner—Irina S. Zemel

(57) ABSTRACT

A macrocellular foam is described having improved cell size and Fire-test-response Characteristics, among other features, which is obtained by selecting a particle size less than 1 micron for the flame retardant adjuvant. The inventors found that the amount of fire retardant adjuvant can be increased for a given foam cell size or the foam cell size can be increased for a given amount of fire retardant adjuvant, allowing the production of foams having exceptionally large, well-formed, cells that have excellent Fire-test-response Characteristics. The benefits are especially noteworthy in relation to thermoplastic foams and inorganic flame retardation adjuvants, due to the unexpected reduction in the nucleation effect of the adjuvant. The foams are useful for improving the acoustic performance of products that are required to meet certain Fire-test-response Characteristics. It may be used in automotive and other transportation devices, building and construction, household and garden appliances, power tool and appliance and electrical supply housing, connectors, and aircraft as acoustic systems for sound absorption and insulation.

15 Claims, No Drawings

OTHER PUBLICATIONS

MICROFINE AO3, Trademark of Great Lakes Chemical Corporation, Antimony Trioxide, Technical Data Sheet.

MICROFINE AO5 and AO5-HP, Trademark of Great Lakes Chemical Corporation, Antimony Trioxide, Technical Data Sheet.

TRUTINT, Trademark of Great Lakes Chemical Corporation, Technical Data Sheet.

Bubble Size Distributions in Freely Expanded Polymer Foams, Chem. Eng. Sci., vol. 52, No. 4, 1997, p. 635-644.

Initial Bubble Growth in Polymer Foam Process, Chem. Eng. Sci., vol. 52, No. 4, 1997, p. 627-633.

Fire Retardancy of Polymeric Materials, A. F. Grand, C. A. Wilkie, Edward D. Weil, Marcel Dekker, Inc., NY, 2000, Chapter 4, Synergists, Adjevants, and Antagonists in Flame-Retardant Systems, E. D. Weil, p. 115-145.

Chemistry and Technology of Polymer Additives, S. A. Makaika, A. Golovoy, C. A. Wilkie, Blackwell Publishing, London, 1999, Chapter 9, Review of Synergists used with Halogen Flame Retardants, R. L. Markezich and R. F. Mundhenke.

R. L. Markezich and R. F. Mundhenke, "Review of Synergists Used With Halogen Flame Retardants", Chemistry and Technology of Polymer Additives, 1999, Paper No. 9, London.

Polyolefin Foam, Chapter 9, Handbook of Polymer Foams & Tech., edited by D. Klempner & K. C. Frisch, Hanser Publishers, Munich, Vienna, NY, Barcelona, 1991.

Polymer Sequence Determination, Carbon-13 NMR Method, J. C. Randall, Academic Press, NY, 1977, 71-78.

US 5,695,691, 12/1997, McLaughlin et al. (withdrawn)

\* cited by examiner

FIRE RESISTANCE ACOUSTIC FOAM

Foams and foamed articles often find utility in acoustic systems for sound absorption and insulation. Such foams, when developed for different market segments (appliance, automotive, building and construction, etc.) often need to meet certain acoustic performance requirements and applicable Fire-test-response Characteristics (ASTM E176-99). To achieve the desired fire rating, a variety of flame retardant components are often added to such foam resin formulations. Unfortunately, the typical flame retardant components and other additives added to the polymer resin formulation cause a number of problems during the manufacture of the foam that have an adverse affect on obtaining acoustically active macrocellular foams. Flame retardants often cause poor cell structure and cell collapse due to their effects on the polymer gel viscosity and melt strength. To reduce the need for high concentrations of flame retardants, flame retardant adjuvants are often added. Flame retardant adjuvants, however, also often are solid particulate materials that act as nucleating agents in the foaming process and provide additional nucleation sites, resulting in the formation of a large number of small cells with variable properties. Unfortunately, small cell foam (average cell size less than 1 millimeter (mm) as determined by ASTM D3575) is not as desirable as large cell foams (larger than 1 mm average cell size as determined by ASTM D3575) in certain end use applications, such as acoustic absorption.

U.S. Pat. No. 4,277,569 teaches the preparation of flame retardant polyolefin foams for thermal insulation and padding. However, the patent does not describe macrocellular foams or flame retardant macrocellular foams for acoustic applications or their preparation.

Japanese Laid Open Patent Application No. 10-204200 describes olefin resin foams for use in vacuum molding made from 100 parts by weight of an olefin type resin comprising 30 to 90 percent by weight propylene type resin and 70 to 10 percent by weight ethylene type resin, 1 to 100 parts by weight of a brominated compound and 0.1 to 10parts by weight of antimony trioxide having an average particle size of 0.4 microns or smaller. Macrocellular foams useful for acoustic applications are not described.

WO 00/15697 describes a macrocellular acoustically active foam which may be surface treated with a solution containing certain fire retardant materials. While that procedure is able to confer fire retardancy, it requires the extra steps of treating the foam after extrusion and perforation and then drying the foam to remove the liquid media used to apply the fire retardant.

Therefore, a significant market need still exists for a large cell, acoustically active foam with good flame retardancy in which the fire retardant components are already in the polymer matrix of polymer foams obtainable by conventional means. This need is not only generally applicable to polymer foams, but is also particularly acute in the area of thermoplastic foams (that is, foams that are substantially uncrosslinked and capable of being remelted) and foams that also resistant water absorption such that they may be used in humid or wet environments without losing performance or potentiating corrosion or microbial growth problems. These and other problems as described below, are solved by the present invention.

One aspect of the present invention is macrocellular polymer foams having an average cell size according to ASTM D3575 of at least 1.5 mm, the foam containing at least one solid particulate flame retardant adjuvant, wherein the solid particulate flame retardant adjuvant has an average particle size less than one micron. The foams also preferably contain a flame retardant.

Another aspect of this invention is a process for making macrocellular polymer foams comprising extruding at an elevated temperature a foamable gel from a first region having a first pressure into a second region having a second pressure less than the first pressure to allow expansion of the foamable gel, the foamable gel comprising at least one thermoplastic polymeric resin, at least one blowing agent, and at least one solid particulate flame retardant adjuvant, wherein the solid particulate flame retardant adjuvant has a particle size less than 1 micron. Included with this aspect are the foamable gel intermediates and the polymer foams obtainable using this process. The foamable gel also preferably contains a flame retardant.

Yet another aspect of this invention is a method for increasing the maximum amount of solid particulate flame retardant adjuvant in macrocellular foams having a given average cell size according to ASTM D3575 of at least 1.5 mm comprising decreasing the average particle size of the flame retardant adjuvant to a smaller average particle size that is less than 1 micron.

Yet another aspect of this invention is a method for improving the acoustic absorption coefficient of macrocellular foams having a given amount of solid particulate flame retardant adjuvant comprising decreasing the average particle size of the flame retardant synergist to a smaller average particle size that is less than 1 micron.

Another aspect of this invention is the use of the above macrocellular acoustic foam as an acoustic absorption or acoustic insulation material, particularly in environments in which fire retardancy is required, such as office partitions, automotive decouplers, domestic appliances and machine enclosures.

DEFINITIONS

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. In particular, the end points of ranges for a particular subject are intended to be freely combinable with other stated ranges for the same subject unless stated otherwise, for example, a stated lower end of a range may be combined with a stated upper end of a range for the same subject, such as average cell size.

The term "micron" means one-millionth of a meter and is interchangeable with the term "micrometer" and the abbreviation "µ".

Unless stated otherwise, the term "flame retardant" when used by itself means a flame retardant which can be any compound or mixture of compounds which imparts flame resistance to the foam compositions of the present invention other than the solid particulate flame retardants described below as a solid particulate flame retardant adjuvant. This term includes, but is not limited to, organic flame retardants such as halogen-containing compounds or mixtures of compounds.

The term "solid particulate flame retardant adjuvant" means solid particulate compounds which increase the flame resistance of the foam compositions of the present invention when they are present in an amount of at least 1 part per hundred parts of total polymer resin (phr). Preferably they enhance the effectiveness of flame-retardants that are present in the polymer matrix of the foam in a form other than as solid particles, such as most organic flame retardants. This term is intended to include, but not be limited to, solid particulate flame retardant synergists, char forming materials, smoke suppressants and solid particulate flame retardants. They are preferably primarily comprised of an inorganic compound or a mixture of inorganic compounds. Unless otherwise specified herein, the term "flame retardant adjuvant" when used in the context of the present invention means "solid particulate flame retardant adjuvant" and the terms "flame retardant synergist" and "synergist" when used in the context of the present invention means "solid particulate flame retardant synergist". The flame retardant synergists are encompassed by the more generic term "solid particulate flame retardant adjuvant". The latter applies by analogy to the solid particulate char forming materials and smoke suppressants, but the distinction in wording is maintained herein between the expression "flame retardant" (without the term "adjuvant") and the expression "solid particulate flame retardant".

The term "flame retardant package" means a combination of flame retardant(s) and flame retardant adjuvant(s) with each other. A typical example is a combination of flame retardant(s), flame retardant synergist(s), and optionally smoke suppressant(s).

The term "interpolymer" is used herein to indicate a polymer wherein at least two different monomers are polymerized to make the interpolymer. This includes copolymers, terpolymers, etc.

The term "macrocellular acoustic foam" is used herein to indicate a foam having an average cell size according to ASTM D3575 greater of at least 1.5 mm, more preferably at least 2 mm, even more preferably at least 3 mm, even more preferably at least 4 mm, preferably up to 20 mm, also preferably up to 15 mm, and for some end uses up to 10 mm is particularly preferred. At a thickness of 35 mm, macrocellular foams may have an average sound absorption coefficient (measured via ASTM E1050 at 250, 500, 1000 and 2000 hertz (Hz) sound frequencies) of greater than 0.15, preferably greater than 0.20, more preferably greater than 0.25, even more preferably greater than 0.30.

Flame Retardant Adjuvant

Examples of solid particulate flame retardant adjuvants are solid particulate flame retardant synergists, char forming materials, smoke suppressants, and solid particulate flame retardants.

Flame retardant synergists include, but are not limited to, metal oxides (e.g., iron oxide, tin oxide, zinc oxide, aluminum trioxide, alumina, antimony trioxide and antimony pentoxide, bismuth oxide, molybdenum trioxide, and tungsten trioxide), zinc borate, antimony silicates, zinc stannate, zinc hydroxystannate, ferrocene and mixtures thereof, antimony trioxide and antimony pentoxide being preferred. Antimony trioxide having an average particle size less than 1 micron is available as a concentrate in low density polyethylene (LDPE) from Great Lakes Chemical Corporation under the trademark MICROFINE™ and antimony pentoxide having an average particle size less than 0.1 micron is available under the trademark. NYACOL™ from Nyacol Nano Technologies, Inc. Ashland, Mass., U.S.A.

Solid particulate char forming materials include, but are not limited to, clay fillers, such as organoclay nanocomposites. Organoclay nanocomposites having an effective particle size less than 1 micron after incorporation into the polymer matrix of a polymer foam of the present invention are available under the trademark CLOISITE™ from Southern Clay Products, Inc., Gonzales, Tex., U.S.A.

Solid particulate smoke suppressants include, but are not limited to, zinc borate, tin oxide, and ferric oxide. Zinc borate, molybdenum trioxide and alumina having an average particle size less than 0.5 microns are available from Nyacol Nano Technologies, Inc.

Solid particulate flame retardants include inorganic fire retardants, such as magnesium hydroxide, having a particle size in the range from less than 1 micron to at least 2 nanometers. An example is magnesium hydroxide available from Nyacol Nano Technologies, Inc., which is reported to have an average particle size of 0.225 microns.

The flame retardant adjuvants may be used individually or in combination with each other. They, and other flame retardant adjuvants having the required and preferred particle sizes, may be made using techniques well known in the art, and may be incorporated into the polymer matrix. See, for example, U.S. Pat. No. 5,409,980, which describes synergists and combinations of the same with flame retardants suitable for the present invention.

An important aspect of this invention is the selection of the average particle size of the flame retardant adjuvant. The conventional view was that increasing the amount of small particle inorganic flame retardant adjuvant would inevitably decrease polymer foam cell size due to nucleation caused by large numbers of adjuvant particles in the polymer melt prior to the foaming step. The inventors have found that decreasing the average particle size to a range of from less than about 1 micron to about 2 nanometers, either as supplied or after incorporation into the polymer matrix of a polymer foam according to this invention, unexpectedly increases the amount by weight of the adjuvant that can be added to the foam while simultaneously maintaining or increasing the average cell size of the macrocellular polymer foam measured according to ASTM D3575. In a preferred embodiment, 99 percent of the particles have a particle size less than 1 micron, more preferably 99.9 percent of the particles have a particle size less than 1 micron.

The average particle size of the flame retardant adjuvant is preferably not greater than 0.5 micron, and more preferably not greater than 0.3 micron.

In a particularly preferred embodiment, the average particle size is not greater than 0.1 micron, more preferably not greater than 0.01 micron, down to about 0.002 micron (2 nanometers), which is in the colloidal particle size range. In this embodiment, at least 99 percent of the particles preferably have a particle size less than 0.1 micron.

The average particle size referred to above is the volumetric average particle size. The particle size of the flame retardant adjuvant as such may be measured by appropriate conventional particle size measuring techniques such as sedimentation, photon correlation spectroscopy, field flow fractionation, disk centrifugation, transmission electron spectroscopy, and dynamic light scattering. A preferred technique is to measure dynamic light scattering using a device such as a Horiba LA-900 Laser Scattering particle size analyzer (Horiba Instruments, Irvine, Calif., USA). The volumetric distribution relates to the weight distribution.

When the flame retardant adjuvant is in the foam polymer matrix, the average particle size may be determined using techniques known in the art. One approach is to use an electron microprobe, such as a Cameca SX-50 electron microprobe, to collect element maps of the particles from a cross-section of the foam and then use a scanning electron microscope, such as a JEOL 6320 field emission scanning electron microscope, to create an image of the mapped particles to examine their surface and cross-sectional features. By overlaying the elemental map over the information derived from the scanning electron microscope image, one can selectively determine the average particle size of the flame retardant adjuvant in question.

The beneficial effect of this invention is preferably obtained with each solid particulate flame retardant adjuvant present in the foam. When multiple flame retardant adjuvants of substantially different chemical composition are present, the term "average particle size" refers to the average particle size of the flame retardant adjuvant having the largest particle size unless stated expressly to the contrary herein. When multiple flame retardant adjuvants are present in a foam that are detectable, but chemically indistinguishable from one another using an electron microprobe, their particle size measurements may be combined to obtain the average particle size of the flame retardant synergist.

The required and preferred particle sizes may be obtained using various milling processes and equipment, such as the process and equipment described in U.S. Pat. No. 5,695,691, which is hereby incorporated herein by reference, by chemical peptization, formation of colloidal sized particles in a plasma with subsequent dispersion of the particles in a suitable continuous phase, by the ion exchange method described in U.S. Pat. No. 3,860,523, U.S. Reissue 31,214 and U.S. Pat. No. 4,110,247.

The particles may be treated to reduce agglomeration or improve dispersibility in certain media and, as in the case of colloidal antimony pentoxide, the particles may be treated to reduce degradation of the polymer resin while the resin is at an elevated temperature, such as during extrusion of the foam of this invention, as taught in, for instance, U.S. Pat. No. 4,741,865. WO 00/64966 describes how to make certain vacuum de-aerated powdered polymer additives having a particle size range overlapping the less than one micron range, including flame retardant adjuvants suitable for use in the foams of this invention. Each of the above patents and published patent applications are incorporated herein by reference for their relevant disclosure.

The amount of inorganic flame retardant adjuvant is preferably at least 1 phr, more preferably at least 2 phr, preferably up to about 6 phr.

Optionally, adjuvants other than the solid particulate flame retardant adjuvants used in this invention may be added to the polymeric resin composition. Examples of such adjuvants include certain organic flame retardant synergists that are known to cause cell nucleation in foams, such as dicumyl(dimethyldiphenylbutane), poly(1,4-diisopropylbenzene), halogenated paraffin, triphenylphosphate, and mixtures thereof.

Flame Retardant

The foams of the invention preferably include a flame retardant which functions to slow or minimize the spread of fire in the foam. The flame retardant is preferably a halogen-containing compound or mixture of compounds which imparts flame resistance to the foams of the present invention.

The term "halo" or "halogenated" includes compounds containing bromine, chlorine, or fluorine, or any combination thereof. Preferably, the flame retardant is a bromine or chlorine-containing compound. They may be halogenated aromatic or alkane compounds.

Suitable aromatic halogenated flame retardants are well-known in the art and include but are not limited to hexahalodiphenyl ethers, octahalodiphenyl ethers, decahalodiphenyl ethers, decahalodiphenyl ethanes; 1,2-bis(trihalophenoxy)ethanes; 1,2-bis(pentahalophenoxy)ethanes; a tetrahalobisphenol-A; ethylene(N,N')-bis-tetrahalophthalimides; tetrabromobisphenol A bis (2,3-dibromopropyl ether); tetrahalophthalic anhydrides; hexahalobenzenes; halogenated indanes; halogenated phosphate esters; halogenated polystyrenes; and polymers of halogenated bisphenol-A and epichlorohydrin, and mixtures thereof. Preferred aromatic halogenated flame retardants may include one or more of tetrabromobisphenol-A (TBBA), tetrabromo bisphenol A bis (2,3-dibromopropyl ether), decabromodiphenyl ethane, brominated trimethylphenylindane, or aromatic halogenated flame retardants with similar kinetics.

Suitable halogenated alkane compounds may be branched or unbranched, cyclic or acyclic. Preferably, the halogenated alkane compound is cyclic. Suitable halogenated alkane flame retardants include and are not limited to hexahalocyclododecane; tetrabromocyclooctane; pentabromochlorocyclohexane; 1,2dibromo-4-(1,2-dibromoethyl)cyclohexane; 1,1,1,3-tetrabromononane; and mixtures thereof. Preferred halogenated alkane flame retardant compounds include hexabromocyclododecane and its isomers, pentabromochlorocyclohexane and its isomers, and 1,2-dibromo-4-(1,2-dibromoethyl)cyclohexane and its isomers. Hexabromocyclododecane (HBCD), and halogenated alkane flame retardants with similar kinetics are preferred.

Commercially available products suitable for use as flame retardants in the present invention include PE-68™ (a trademark and product of the Great Lakes Chemical Corporation). Suitable flame retardants are well known, and include brominated organic compounds such as are described in U.S. Pat. Nos. 4,446,254 and 5,171,757, the entire contents of which are herein incorporated by reference. For foams, the halogen content provided by the halogenated flame retardants in the final foams should be 0.05–20 phr, preferably 0.1–15 phr and most preferably 0.5–15 phr.

The polymeric resin compositions preferably include at least about 0.5 phr halogenated flame retardant, more preferably at least about 0.8 phr, preferably up to about 12 phr, more preferably up to about 6 phr halogenated flame retardant. The parts per hundred parts of resin ("phr") are based on the total parts by weight of polymer in the flame retardant-containing composition.

In a preferred embodiment, the flame retardant is a hexahalocyclododecane, preferably hexabromocyclododecane (HBCD), or tetrabromobisphenol A bis (2,3-dibromopropyl ether), PE™-68, or a combination with any other halogenated or non-halogenated flame-retardants, which can include, but are not limited to phosphorous based flame retardants such as triphenyl phosphate and encapsulated red phosphorous.

In a preferred embodiment, the flame retardant is a mixture of at least two different types of flame retardants that may be added together or separately into a polymer resin composition. A mixture that includes both a halogenated alkane compound and an aromatic halogenated compound has been found to enhance blending of α-olefin polymers with alkenyl aromatic polymers which are described in more detail under separate headings below, and this combination tends to reduce the density of foams made from that mixture. The ratio of aromatic halogenated flame retardant to halogenated alkane flame retardant in parts by weight for that purpose is preferably from about 16:1 to 1:16, more preferably from about 7.5:1 to 1:7.5, and most preferably about 5:1 to 1:5. The concentration of aromatic halogenated flame retardant is preferably at least about 0.5 parts by weight per hundred parts by weight (phr) of the α-olefin polymer component, more preferably at least 1 phr, and preferably up to 8 phr based on the weight of the α-olefin polymer component. The concentration of halogenated alkane flame retardant is preferably at least about 0.5 parts by weight per hundred parts by weight (phr) of the alkenyl aromatic polymer component, more preferably at least 1 phr, and preferably up to 8 phr based on the weight of the alkenyl aromatic polymer component. In a preferred embodiment, the flame retardant mixture includes a combination of hexahalocyclododecane such as hexabromocyclododecane (HBCD), and tetrabromobisphenol A bis (2,3-dibromopropyl ether).

Synergistic combinations, such as mixtures of one or more halogenated compounds and one or more flame retardant synergists, typically are used preferably at a ratio of 0.25 to 25, preferably 0.5 to 15, more preferably from 0.5 to 12 parts by weight flame retardant halogen to 1 part by weight of flame retardant synergist. In the case of an antimony-containing synergist, the ratio of halogen contained in the halogenated flame retardant to antimony contained in the flame retardant synergist is preferably in the range from 1 to 7 moles, more preferably 1 to 6 moles, and even more preferably 1 to 4 moles, halogen contributed by the flame retardant per mole antimony contributed by the flame retardant synergist.

Stability Control Agent or Cell Size Enlarging Agent

A stability control agent or cell size enlarging agent is optionally added to the present foam to enhance dimensional stability. Preferred agents include amides and esters of C10–24 fatty acids. Such agents are seen in U.S. Pat. Nos. 3,644,230 and 4,214,054, which are incorporated herein by reference. Most preferred agents include stearyl stearamide, glycerol monostearate (available from ICI Americas Inc., under the trademark Atmer™ 129), glycerol monobehenate, and sorbitol monostearate. Typically, such stability control agents are employed in an amount ranging from 0.1 to 10 phr.

Other Additives

The foam of the present invention may optionally contain one or more conventional additives to the extent the additives do not interfere with the desired foam properties. Typical additives include antioxidants (such as hindered phenols (for example, Irganox™ 1010, trademark of and available from the Ciba Geigy Corporation), ultraviolet stabilizers, colorants, pigments, fillers, acid scavengers, and extrusion aids. In addition, a nucleating agent may optionally be added in order to control the size of foam cells, if necessary.

Polymer

The polymer used to make the foam may be any polymer capable of formiing a foam structure. Preferred polymers are thermoplastic polymers, such as α-olefin polymers, vinyl aromatic polymers, and ethylene-styrene interpolymers, and combinations (for example, blends) thereof, as further described below.

Preferably the resin to be foamed comprises an ethylene or α-olefin homopolymer resin or a blend of one or more of said ethylene or $C_3$–$C_{20}$ α-olefin homopolymers. The resin to be foamed can also comprise a blend of one or more of said ethylene or $C_3$–$C_{20}$ α-olefin homopolymers with a second polymer component. This second polymer component can include, but is not limited to, ethylene/$C_3$–$C_{20}$ α olefin interpolymers (including polyolefin elastomers, and polyolefin plastomers) or one or more substantially random interpolymers, or combinations thereof.

1. α-Olefin Polymers

The α-olefin polymers are polymers or interpolymers containing repeated units derived by polymerizing an α-olefin. As defined herein, the α-olefin polymer contains essentially no polymerized monovinylidene aromatic monomers and no sterically hindered aliphatic or cycloaliphatic vinyl or vinylidene monomers. Particularly suitable α-olefins have from 2 to about 20 carbon atoms, preferably from 2 to about 8 carbon atoms, and include ethylene, propylene, 1-butene, 4-methyl-1-pentene, 1-hexene, 1-octene and the like. Preferred α-olefin polymers are homopolymers of ethylene or propylene and interpolymers of ethylene with a $C_3$–$C_8$ α-olefin. The α-olefin polymer may also contain, in polymerized form, one or more other non-aromatic monomers that are interpolymerizable with the α-olefin and which contain an aliphatic or cycloaliphatic group. Such monomers include, for example, vinyl acetate, acrylic acid, methacrylic acid, esters of acrylic or methacrylic acid and acid anhydrides such as maleic anhydride. The α-olefin polymer preferably contains at least 75 percent by weight, preferably at least 95 percent by weight, of polymerized α-olefin monomers. More preferably, the α-olefin polymer contains at least 85 percent by weight polymerized ethylene, with polymerized α-olefin monomers constituting the remainder of the polymer. In other words, the α-olefin polymer may contain polyethylene or a copolymer of ethylene and up to about 15 percent of another α-olefin.

Particularly suitable α-olefin polymers include low density polyethylene (LDPE), which term is used herein to designate polyethylene homopolymers made in a high pressure, free radical polymerization process. These LDPE polymers are characterized by having a high degree of long chain branching. LDPE useful in this invention preferably has a density of about 0.910 to 0.970 g/cc (ASTM D792) and a melt index from about 0.02 to about 100 grams per 10 minutes (g/10 min), preferably from 0.2 to about 30 grams per 10 minutes (as determined by ASTM Test Method D 1283, condition 190° C./2.16 kg). LDPE employed in the present composition preferably has a density of less than or equal to 0.935 g/cc (ASTM D792) and a melt index from 0.05 to 50, more preferably from 0.1 to 20, grams per 10 minutes (as determined by ASTM Test Method D1238, Condition 190°/2.16).

The so-called linear low density polyethylene (LLDPE) and high density polyethylene (HDPE) products are also useful herein. These polymers are homopolymers of polyethylene or copolymers thereof with one or more higher α-olefins and characterized by the near or total absence (less than 0.01/1000 carbon atoms) of long chain branching.

LLDPE and HDPE are made in a low pressure process employing conventional Ziegler-Natta type catalysts, as described in U.S. Pat. No. 4,076,698. LLDPE and HDPE are generally distinguished by the level of α-olefin comonomer that is used in their production, with LLDPE containing higher levels of comonomer and accordingly lower density. Suitable LLDPE polymers having a density of from about 0.85 to about 0.940 g/cc (ASTM D792) and a melt index (ASTM D1238, condition 190° C./2.16 kg) of about 0.01 to about 100 grams/10 minutes. Suitable HDPE polymers have a similar melt index, but have a density of greater than about 0.940 g/cc.

LLDPE polymers having a homogeneous distribution of the comonomer are described, for example, in U.S. Pat. No. 3,645,992 to Elston and U.S. Pat. Nos. 5,026,798 and 5,055,438 to Canich.

Yet another type of α-olefin polymer are substantially linear olefin polymers as described in U.S. Pat. Nos. 5,272,236 and 5,278,272, incorporated herein by reference. The substantially linear olefin polymer is advantageously a homopolymer of a $C_2$–$C_{20}$ α-olefin or, preferably, an interpolymer of ethylene with at least one $C_3$–$C_{20}$ α-olefin and/or a $C_4$–$C_{18}$ diolefin. These polymers contain a small amount of long-chain branching (i.e. about 0.01 to 3, preferably 0.01–1 and more preferably 0.3–1 long chain branch per 1000 carbon atoms) and typically exhibit only a single melting peak by differential scanning calorimetry. Particularly suitable substantially linear olefin polymers have a melt index (ASTM D1238, Condition 190° C./2.16 kg) of from about 0.01 to about 1000 g/10 min, and a density of from 0.85 to 0.97 g/cc, preferably 0.85 to 0.95 g/cc and especially 0.85 to 0.92 g/cc. Examples include polyolefin plastomers, such as those marketed by The Dow Chemical Company under the trademark AFFINITY™ and polyethylene elastomers, such as those marketed by Du Pont Dow Elastomers LLC under the trademark ENGAGE™.

Another suitable α-olefin polymer includes propylene polymers. The term "propylene polymer" as used herein means a polymer in which at least 50 weight percent of its monomeric units are derived directly from propylene. Suitable ethylenically unsaturated monomers other than propylene that may be included in the propylene polymer, include α-olefins, vinylacetate, methylacrylate, ethylacrylate, methyl methacrylate, acrylic acid, itaconic acid, maleic acid, and maleic anhydride. Appropriate propylene interpolymers include random, block, and grafted copolymers or interpolymers of propylene and an olefin selected from the group consisting of ethylene, $C_4$–$C_{10}$ 1-olefins, and $C_4$–$C_{10}$ dienes. Propylene interpolymers also include random terpolymers of propylene and 1-olefins selected from the group consisting of ethylene and $C_4$–$C_8$ 1-olefins. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, and 2,3-dimethyl-1,3-hexadiene. As used herein, the term "interpolymers" means polymers derived from the reaction of two of more different monomers and includes, for example, copolymers and terpolymers.

The propylene polymer material may be comprised solely of one or more propylene homopolymers, one or more propylene copolymers, and blends of one or more of each of propylene homopolymers and copolymers. The polypropylene preferably comprises at least 70, even more preferably at least 90, and even more preferably 100, weight percent propylene monomer derived units (that is, the propylene homopolymers are preferred).

The propylene polymer preferably has a weight average molecular weight ($M_W$) of at least 100,000. $M_W$ can be measured by known procedures.

The propylene polymer also preferably has a branching index less than 1. The branching index is an approach to quantifying the degree of long chain branching selected for this particular invention. The definition of branching index and procedure for determining the same is described in column 3, line 65 to column 4, line 30, of U.S. Pat. No. 4,916,198, which is incorporated herein by reference. The branching index is more preferably less than 0.9, and even more preferably less than 0.4.

The propylene polymer has a tan δ value not greater than 1.5, preferably not greater than 1.2, even more preferably not greater than 1.0, and even more preferably not greater than 0.8. Tan δ may be calculated from g"/g', where g" is the loss modulus of the propylene polymer and g' is storage modulus of the propylene polymer melt using a 2.5 mm thick and 25 mm diameter specimen of the propylene polymer at 190 C at a one Radian per second oscillating frequency. These parameters may be measured using a mechanical spectrometer, such as a Rheometrics Model RMS-800 available from Rheometrics, Inc., Piscataway, N.J., U.S.A. Further details of how to carry out this determination of the tan δ, g' and g" values is provided in column 5, lines 59 to 64, and column 6, lines 4 to 29, of U.S. Pat. No. 5,527,573, which is incorporated herein by reference.

In addition or in the alternative, the propylene polymer preferably has a melt tension of at least 7 centiNewtons (cN), more preferably at least 10 cN, and even more preferably at least 15 cN, and even more preferably at least 20 cN. Preferably, the propylene polymer has a melt tension not greater than 60 cN, more preferably not greater than 40 cN. The term "melt tension" as used throughout this description refers to a measurement of the tension in cN of a strand of molten polymer material at extruded from a capillary die with an diameter of 2.1 mm and a length of 40 mm at 230° C. at an extrusion speed of 20 mm/minute (min.) and a constant take-up speed of 3.14 meter/minute using an apparatus known as a Melt Tension Tester Model 2 available from Toyo Seiki Seisaku-sho, Ltd. This method for determining melt tension is sometimes referred to as the "Chisso method".

In addition or in the alternative, the propylene polymer preferably has a melt strength of at least 10 centiNewtons (cN), more preferably at least 20 cN, and even more preferably at least 25 cN, and even more preferably at least 30 cN. Preferably, the propylene polymer has a melt strength not greater than 60 cN, more preferably not greater than 55 cN. The term "melt strength" throughout this description refers to a measurement of the tension in cN of a strand of molten polymer material extruded from a capillary die with an diameter of 2.1 mm and a length of 41.9 mm at 190° C. at a rate of 0.030 cc/sec. and stretched at a constant acceleration to determine the limiting draw force, or strength at break, using an apparatus known as a Gottfert Rheotens™ melt tension apparatus available from Gottfert, Inc.

The propylene polymer used in the process of the invention preferably also has a melt elongation of at least 100 percent, more preferably at least 150 percent, most preferably at least 200 percent as measured by the same Rheotens™ melt tension apparatus and general procedure described above.

The propylene polymer material preferably also has a melt flow rate of at least 0.01 more preferably at least 0.05, even more preferably at least 0.1 g/10 min., and even more preferably at least 0.5 g/10 min. up to 100, more preferably up to 50, even more preferably up to 20, and even more preferably up to 10, g/10 min. Throughout this description, the term "melt flow rate" refers to a measurement conducted according to American Society for Testing and Materials (ASTM) D1238 condition 230° C./2.16 kg. (aka Condition L).

In addition, α-olefin polymers that have been subjected to coupling or light crosslinking treatments are useful herein, provided that they remain melt processable. Such grafting or light crosslinking techniques include silane grafting as described in U.S. Pat. No. 4,714,716 to Park; peroxide coupling as described in U.S. Pat. No. 4,578,431 to Shaw et al., and irradiation as described in U.S. Pat. No. 5,736,618 to Poloso. Preferably, the treated polymer has a gel content of less than 10 percent, more preferably less than 5 percent, most preferably less than 2 percent by weight, as determined by gel permeation chromatography. Treatment of this type is of particular interest for HDPE, LLDPE or substantially linear polyethylene copolymers, as it tends to increase the melt tension and melt viscosity of those polymers to a range that improves their ability to be processed into foam in an extrusion process.

Preferred propylene polymers include those that are branched or lightly cross-linked. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. This method is illustrated in U.S. Pat. No. 3,250,731 with a polyfunctional azide, U.S. Pat. No. 4,714,716 (and published International Application WO 99/10424) with an azidofunctional silane and EP 879,844-A1 with a peroxide in conjunction with a multi-vinyl functional monomer. The aforementioned U.S. patents are incorporated herein by reference. Irradiation techniques are illustrated by U.S Pat. Nos. 5,605,936 and 5,883,151, which are also incorporated by reference. The polymer composition used to prepare the foam preferably has a gel content of less than 10 percent, more preferably less than 5 percent, per ASTM D2765-84, Method A.

If an ethylene polymer, such as the ethylene homopolymer, is blended with a propylene polymer, the weight ratio of the propylene polymer to the ethylene polymer is preferably at least 35:65, more preferably at least 1:1, preferably up to 9:1, and more preferably up to 7:1. Such blends may optionally contain at least one substantially random interpolymer, such as an ethylene/styrene interpolymer, as described under a separate heading below. An advantage of these foams is the ability to use it in locations where a high service temperature is required and yet have a foam that is thermoformable and potentially recyclable. An example is in the compartment of a motor, such as an internal combustion engine, such as found on a vehicle, electric generator, compressor or pump. An indication of high service temperature is resistance to heat distortion at elevated temperatures. As used herein, the expression, "heat distortion temperature" refers to the maximum temperature at which the foam body does not shrink more than 5 percent by volume during an exposure to that temperature for one hour. Preferably the heat distortion temperature of the foams according to the present invention is at least 130° C., more preferably at least 140° C., and even more preferably at least 150° C.

2. Alkenyl Aromatic Polymer

For purposes of this invention, the alkenyl aromatic polymer of the polymer blend is a melt-processable polymer or melt processable impact-modified polymer in the form of polymerized monovinylidene aromatic monomers as represented by the structure:

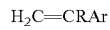

$$H_2C=CRAr$$

wherein R is hydrogen or an alkyl radical that preferably has no more than three carbon atoms and Ar is an aromatic group. R is preferably hydrogen or methyl, most preferably hydrogen. Aromatic groups Ar include phenyl and naphthyl groups. The aromatic group Ar may be substituted. Halogen (such as Cl, F, Br), alkyl (especially $C_1$–$C_4$ alkyl such as methyl, ethyl, propyl and t-butyl), $C_1$–$C_4$ haloalkyl (such as chloromethyl or chloroethyl) and alkoxyl (such as methoxyl or ethoxyl) substituents are all useful. Styrene, para-vinyl toluene, α-methyl styrene, 4-methoxy styrene, t-butyl styrene, chlorostyrene, vinyl naphthalene and the like are all useful monovinylidene aromatic monomers. Styrene is especially preferred.

The alkenyl aromatic polymer may be a homopolymer of a monovinylidene aromatic monomer as described above. Polystyrene homopolymers are the most preferred alkenyl aromatic polymers. Interpolymers of two or more monovinylidene aromatic monomers are also useful.

Although not critical, the alkenyl aromatic polymer may have a high degree of syndiotactic configuration; that is, the aromatic groups are located alternately at opposite directions relative to the main chain that consists of carbon-carbon bonds. Homopolymers of monovinylidene aromatic polymers that have syndiotacticity of 75 percent r diad or greater or even 90 percent r diad or greater as measured by $^{13}C$ NMR are useful herein.

The alkenyl aromatic polymer may also contain repeating units derived from one or more other monomers that are copolymerizable with the monovinylidene aromatic monomer. Suitable such monomers include N-phenyl maleimide; acrylamide; ethylenically unsaturated nitriles such as acrylonitrile and methacrylonitrile; ethylenically unsaturated carboxylic acids and anhydrides such as acrylic acid, methacrylic acid, fumaric anhydride and maleic anhydride; esters of ethylenically unsaturated acids such as $C_1$–$C_8$ alkyl acrylates and methacrylates, for example n-butyl acrylate and methyl methacrylate; and conjugated dienes such as butadiene or isoprene. The interpolymers of these types may be random, block or graft interpolymers. Blends of interpolymers of this type with homopolymers of a monovinylidene aromatic monomer can be used. For example, styrene/$C_4$–$C_8$ alkyl acrylate interpolymers and styrene-butadiene interpolymers are particularly suitable as impact modifiers when blended into polystyrene. Such impact-modified polystyrenes are useful herein.

In addition, the alkenyl aromatic polymers include those modified with rubbers to improve their impact properties. The modification can be, for example, through blending, grafting or polymerization of a monovinylidene aromatic monomer (optionally with other monomers) in the presence of a rubber compound. Examples of such rubbers are homopolymers of $C_4$–$C_6$ conjugated dienes such as butadiene or isoprene; ethylene/propylene interpolymers; interpolymers of ethylene, propylene and a nonconjugated diene such as 1,6-hexadiene or ethylidene norbornene; $C_4$–$C_6$ alkyl acrylate homopolymers or interpolymers, including interpolymers thereof with a $C_1$–$C_4$ alkyl acrylate. The rubbers are conveniently prepared by anionic solution polymerization techniques or by free radical initiated solution, mass or suspension polymerization processes. Rubber polymers that are prepared by emulsion polymerization may be agglomerated to produce larger particles having a multimodal particle size distribution.

Preferred impact modified alkenyl aromatic polymers are prepared by dissolving the rubber into the monovinylidene aromatic monomer and any comonomers and polymerizing the resulting solution, preferably while agitating the solution so as to prepare a dispersed, grafted, impact modified polymer having rubber domains containing occlusions of the matrix polymer dispersed throughout the resulting polymerized mass. In such products, polymerized monovinylidene aromatic monomer forms a continuous polymeric matrix. Additional quantities of rubber polymer may be blended into the impact modified polymer if desired.

Commercial PS (polystyrene), HIPS (high impact polystyrene), ABS (acrylonitrile-butadiene-styrene) and SAN (styrene-acrylonitrile) resins that are melt processable are particularly useful in this invention.

The alkenyl aromatic polymer has a molecular weight such that it can be melt processed with a blowing agent to form a cellular foam structure. Preferably, the alkenyl aromatic polymer has a melting temperature of about 60° C. to about 310° C. and a melt flow rate of about 0.5 to about 50 grams per 10 minutes (American Society for Testing and Materials (ASTM) test D1238, 200° C./5 kg). A weight average molecular weight of about 60,000 to about 350,000, preferably from about 100,000 to about 300,000, is particularly suitable. In the case of an impact modified polymer, these molecular weight numbers refer to molecular weight of the matrix polymer (that is, the continuous phase polymer of a monovinylidene aromatic monomer).

The aromatic polymer may be blended with the α-olefin polymer, optionally in the presence of a compatibilizer. Such a polymer blend preferably contains from about 10 percent, more preferably from about 30 percent, more preferably from about 40 percent up to about 90 percent, more preferably up to about 70 percent, and more preferably up to about 60 percent by weight of the α-olefin polymer based on the combined weight of alkenyl aromatic polymer, α-olefin polymer, and polymeric compatibilizer. Suitable compatibilizers include certain aliphatic α-olefin/monovinylidene aromatic interpolymers such as the substantially random interpolymers described under a separate heading below, hydrogenated or non-hydrogenated monovinylidene aromatic/conjugated diene block (including diblock and triblock) copolymers, and styrene/olefin graft copolymers. The term "interpolymer" is used herein to indicate a polymer wherein at least two different monomers are polymerized to make the interpolymer. This includes copolymers, terpolymers, etc.

Although the flame retardant package is discussed separately, the flame retardant package may also act as a compatibilizer in that it minimizes macroscopic phase separation of the polymer blend. If sufficient quantities of the flame retardant package are employed, then a polymeric compatibilizer may be unnecessary. However, polymeric compatibilizers may be advantageously employed in the present invention.

3. Substantially Random Interpolymers

Substantially random interpolymers comprise polymer units derived from one or more α-olefin monomers with one or more vinyl or vinylidene aromatic monomers and/or a hindered aliphatic or cycloaliphatic vinyl or vinylidene monomers. The term substantially random as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, substantially random interpolymers do not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad ("r diad") sequences should not exceed 75 percent of the total peak area of the main chain methylene and methine carbons.

Suitable α-olefins include for example, α-olefins described above as suitable for making α-olefin polymers. They preferably contain from 2 to 12, more preferably from 2 to 8, carbon atoms. Particularly suitable are ethylene, propylene, butene-1, pentene-1,4-methyl-1-pentene, hexene-1 or octene-1 or ethylene in combination with one or more of propylene, butene-1,4-methyl-1-pentene, hexene-1 or octene-1. These α-olefins do not contain an aromatic moiety.

Suitable vinyl or vinylidene aromatic monomers that can be employed to prepare the interpolymers include, for example, those represented by the following formula:

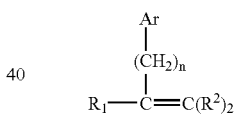

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Exemplary vinyl or vinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

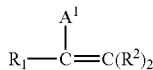

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

Other optional polymerizable ethylenically unsaturated monomer(s) include norbornene and $C_{1-10}$ alkyl or $C_{6-10}$ aryl substituted norbornenes. Exemplary substantially random interpolymers include ethylene/styrene, ethylene/styrene/propylene, ethylene/styrene/octene, ethylene/styrene/butene, and ethylene/styrene/norbornene interpolymers.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers may also be modified by various cross-linking processes including, but not limited to peroxide-, silane-, sulfur-, radiation-, or azide-based cure systems. A full description of the various cross-linking technologies is described in U.S. Pat. Nos. 5,869,591 and 5,977,271, the entire contents of both of which are herein incorporated by reference. Dual cure systems, which use a combination of heat, moisture cure, and radiation steps, may be effectively employed. Such dual cure systems are disclosed and claimed in U.S. Pat. No. 5,911,940, which is incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc. The substantially random interpolymers may also be modified by various cross-linking processes including, but not limited to the incorporation of a diene component as a termonomer in its preparation and subsequent cross linking by the aforementioned methods and further methods including vulcanization via the vinyl group using sulfur for example as the cross linking agent.

The substantially random interpolymers include the pseudo-random interpolymers as described in EP-A-0,416,815 by James C. Stevens et al. and U.S. Pat. No. 5,703,187 by Francis J. Timmers, both of which are incorporated herein by reference in their entirety. The substantially random interpolymers also include the substantially random terpolymers as described in U.S. Pat. No. 5,872,201 which is incorporated herein by reference in their entirety. The substantially random interpolymers are best prepared by polymerizing a mixture of polymerizable monomers in the presence of one or more metallocene or constrained geometry catalysts in combination with various cocatalysts. Preferred operating conditions for the polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in EP-A-416,815; EP-A-514,828; EP-A-520,732; and EP-B-705,269; as well as U.S. patents: U.S. Pat. Nos. 5,055,438; 5,057,475; 5,096,867; 5,064,802; 5,132,380; 5,189,192; 5,321,106; 5,347,024; 5,350,723; 5,374,696; 5,399,635; and 5,470,993, all of which patents and applications are incorporated herein by reference.

The substantially random interpolymers usually contain from 0.5 to 65, preferably from 1 to 55, more preferably from 1 to 50 mole percent of at least one vinyl or vinylidene aromatic monomer and/or hindered aliphatic or cycloaliphatic vinyl or vinylidene monomer and from 35 to 99.5, preferably from 45 to 99, more preferably from 50 to 99 mole percent of ethylene and/or at least one aliphatic α-olefin having from 3 to 20 carbon atoms.

The substantially random interpolymer(s) applicable to the present invention can have a melt index of from 0.01 to 1000, and preferably from 0.01 to 100, more preferably from 0.05 to 50 grams per 10 minutes (as determined by ASTM Test Method D1238, Condition 190°/2.16).

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the interpolymer, if desired, by extraction techniques such as selective precipitation from solution with a non-solvent for either the interpolymer or the vinyl or vinylidene aromatic homopolymer. For the purpose of the present invention it is preferred that no more than 20 weight percent, preferably less than 15 weight percent, most preferably less than 10 weight percent based on the total weight of the interpolymers of atactic vinyl or vinylidene aromatic homopolymer is present.

Most preferred as the second polymer component are the substantially random interpolymers such as those marketed by The Dow Chemical Company under the trademark INDEX™.

In a preferred embodiment, the foam of the present invention is made from a blend of at least one substantially random interpolymer, such as an ethylene/styrene interpolymer, with an α-olefin polymer, such as an ethylene polymer, such as LDPE. Suitable blends and processes for making foams from the same are described in U.S. Pat. No. 6,160,029, which is incorporated herein by reference. The foams made from these blends preferably have a density measured under DIN 53420 not greater than 40 kg/m$^3$, preferably have an average cell size of at least 4 mm, preferably at least 5 mm, and preferably have a water absorption of less than 10 percent, more preferably less than 5 percent, by volume after 24 hours immersion according to DIN 53433.

In another preferred embodiment, the foam of the present invention is made from a blend of at least one substantially random interpolymer, such as an ethylene/styrene interpolymer, with an alkenyl aromatic polymer, such as styrene. Suitable blends and processes for making foams from the same are described in U.S. Pat. No. 6,187,232, which is incorporated herein by reference.

Preparation of Foams

The foam structure of the invention may be prepared by conventional extrusion foaming processes. This process generally entails feeding the ingredients of the polymeric resin composition together or separately into the heated barrel of an extruder, which is maintained above the crystalline melting temperature or glass transition temperature of the constituents of the blend; heating the polymeric resin composition to form a plasticized or melt polymer material; incorporating a blowing agent into the melt polymer material to form a foamable gel; and expanding the foamable gel to form the foam product. The foamable gel may be extruded or conveyed through a die of desired shape to an area of lower pressure where the mixture expands to form a cellular foam structure. The lower pressure is preferably at an atmospheric level. Typically, the mixture is cooled to within +/−20° C. of the highest crystalline melting point or glass transition temperature of the components of the polymer blend before extrusion in order to optimize physical characteristics of the foam.

Processes for making ethylenic polymer foam structures are described in C. P. Park. "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated herein by reference.

A preferred process involves using a low die pressure for extrusion which is greater than the prefoaming critical die pressure but can only go as high as four times, more preferably three times, even more preferably two times the prefoaming critical die pressure. The prefoaming critical die pressure is best determined experimentally for formulations comprising not only the polymer components but also additional additives such as flame retardants, synergists and cell enlarging agents. This is typically accomplished by preparing foams at several prefoaming die pressures and determining the effect of changes in the die pressure on the foam cell size and appearance. Below the prefoaming critical die pressure, the quality of the foam deteriorates sharply, rough skin is observed on the foam due to rupture of surface cells and typically a crackling noise is heard at the die due to rapid degassing of the blowing agent. At too high die pressures, the foam tends to nucleate significantly causing a loss in cell size upper limit which typically corresponds to a value of up to four times, the prefoaming critical die pressure.

In another embodiment of the present invention, the resulting foam structure is optionally formed in a coalesced strand form by extrusion of the ethylenic polymer material through a multi-orifice die and wherein the die pressure for extrusion is greater than the prefoaming critical die pressure but can only go as high as four times, preferably three times, more preferably two times the prefoaming critical die pressure. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

Alternatively, the resulting foam structure is conveniently formed by an accumulating extrusion process as seen in U.S. Pat. No. 4,323,528, which is incorporated by reference herein. In this process, low density foam structures having large lateral cross-sectional areas are prepared by: 1) forming under pressure a gel of the ethylenic polymer material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure, and 6) wherein the die pressure for extrusion is greater than the prefoaming critical die pressure where prefoaming occurs but can only go as high as four times, more preferably three times, even more preferably two times the prefoaming critical die pressure.

Blowing agents useful in making the resulting foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9, preferably 1–6, carbon atoms, aliphatic alcohols having 1–3 carbon atoms, and fully and partially halogenated aliphatic hydrocarbons having 1–4 carbon atoms. U.S. Pat. No. 6,048,909 to Chaudhary et al. discloses a number of suitable blowing agents at column 12, lines 6–56, the teachings of which are incorporated herein by reference. Preferred blowing agents include aliphatic hydrocarbons having 1–9 carbon atoms, especially propane, n-butane and isobutane, more preferably isobutane.

The amount of blowing agent incorporated into the polymer melt material to make a foam-forming polymer gel is typically from 0.2 to 5.0, preferably from 0.5 to 3.0, and most preferably from 1.0 to 2.50 gram moles per kilogram of polymer. However, these ranges should not be taken to limit the scope of the present invention.

The foam is conveniently extruded in various shapes having a preferred foam thickness in the direction of minimum foam thickness in the range from about 1 mm to about 100 mm or more. When the foam is in the form of a sheet, the foam preferably has a thickness in the range from about 1 or 2 mm to about 15 mm. When the foam is in the form of a plank, the foam preferably has a thickness in the range from about 15 mm to about 100 mm. The desired thickness depends in part on the application.

When the foam of this invention is a thick sheet or plank, the foam desirably has perforation channels. Perforation channels are preferably not employed when the foam is a thin sheet. Thick polymer foams may have an average thickness perpendicular to the surface perforated of at least about 25 millimeters (mm) and the polymer foam may be preferably perforated to an average depth of at least 5 mm below the surface of the polymer foam. Typically, perforation comprises puncturing the base foam. A description of how to create suitable perforation channels to accelerate release of blowing agent from the foam is provided in U.S. Pat. No. 5,585,058, which is incorporated herein by reference. Accelerated aging of the foam to remove blowing agent may also be achieved, for example, by perforation techniques and heat aging as described in U.S. Pat. No. 5,242,016 to Kolosowski and U.S. Pat. No. 5,059,376 to Pontiff. Perforation of macrocellular foams to improve acoustic performance of thermoplastic foams is described in WO 00/15697, which is also incorporated herein by reference.

The foam of this invention preferably has perforation channels, more preferably a multiplicity of perforation channels extending from the at least one surface into the foam such that there is an average of at least one, preferably at least 5, more preferably at least 10, even more preferably at least 20, and even more preferably at least 30, perforation channel(s) per 10 square centimeters ($cm^2$) area of the at least one surface. The term "multiplicity" as used herein means at least two. In a preferred embodiment, the foam of this invention contains at least seven perforation channels.

The perforation channels preferably have an average diameter at the at least one surface of at least 0.1 mm, more preferably at least 0.5 mm, and even more preferably at least 1 mm and preferably up to about the average cell size of the foam measured according to ASTM D3756. One or more surfaces of the foam preferably has an average of at least four perforation channels per square centimeter extending from the at least one surface into the foam.

The polymer foam preferably has an average thickness perpendicular to the surface perforated of at least 25 mm and the polymer foam is preferably perforated to an average depth of at least 5 mm below the surface of the polymer foam.

Typically, perforation comprises puncturing the base foam with one or more pointed, sharp objects. Suitable pointed, sharp objects include needles, spikes, pins, or nails. In addition, perforation may comprise drilling, laser cutting, high pressure fluid cutting, air guns, or projectiles.

In addition, the base foam may be prepared to have elongated cells by pulling the foam during expansion. Such pulling results in elongated cells without changing or often, increasing the cell size in the horizontal direction. Thus, pulling results in an increased average cell size in the direction perpendicular to the vertical direction (EH average) and facilitates perforation.

Perforation of the base foam may be performed in any pattern, including square patterns and triangular patterns. Although the choice of a particular diameter of the sharp, pointed object with which to perforate the base foam is dependent upon many factors, including average cell size, intended spacing of perforations, pointed, sharp objects useful in the preparation of certain foams of the present invention will typically have diameters of from 1 mm to 4 mm.

Compression may be used as an additional means of opening cells. Compression may be performed by any means sufficient to exert external force to one or more surfaces of the foam, and thus cause the cells within the foam to burst. Compression during or after perforation is especially effective in rupturing the cell walls adjacent to the channels created by perforation since a high pressure difference across the cell walls can be created. In addition, unlike needle punching, compression can result in rupturing cell walls facing in all directions, thereby creating tortuous paths desired for sound absorption.

The mechanical opening of closed-cells of the base foam lowers the airflow resistivity of the base foam by creating large-size pores in the cell walls and struts. In any event, regardless of the particular means by which it does so, such mechanical opening of closed-cells within the base thermoplastic polymer foam serves to enhance the usefulness of the foam for sound absorption and sound insulation applications.

Of course, the percentage of cells opened mechanically will depend on a number of factors, including cell size, cell shape, means for opening, and the extent of the application of the means for opening applied to the base foam.

The resulting foam structure preferably exhibits good dimensional stability. Preferred foams recover 80 or more percent of initial volume within a month with initial volume being measured within 30 seconds after foam expansion. Volume is measured by a suitable method such as cubic displacement of water.

In addition, a nucleating agent may optionally be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from 0 to 5 phr.

In one embodiment, the foam structure may be substantially cross-linked. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

Crosslinked acoustically active thermoplastic macrocellular foams and methods for manufacturing them are described in more detail in WO 00/15700, which is incorporated herein by reference.

The present foam structure may also be made into a continuous plank structure by an extrusion process utilizing a long-land die as described in GB 2,145,961A. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material In a preferred embodiment of the present invention, the macrocellular thermoplastic polymer foams have less than 35 percent crosslinking after 10 days aging. The resulting foam structure more preferably has not more than 30 percent crosslinking, even more preferably less than 20 percent crosslinking, and even more preferably less than 10 percent crosslinking, after 10 days aging. The foam of this invention is even more preferably substantially noncrosslinked or uncrosslinked and the polymer material comprising the foam structure is preferably substantially free of crosslinking.

The resulting foam structure may be either closed-celled or open-celled. The open cell content will range from 0 to 100 volume percent as measured according to ASTM D2856-A.

The resulting foam structure preferably has a density of less than 300, preferably less than 100, more preferably less than 60 and most preferably from 10 to 50 kilograms per cubic meter.

The macrocellular foams exhibit an average cell size of at least 1.5 mm, preferably 2 mm, more preferably at least 3 mm, even more preferably at least 4 mm, preferably up to 20 mm, 15 mm and 10 mm also being preferred, according to ASTM D3575.

Properties and End Uses

Applications for the macrocellular flame resistant acoustic compositions of the present invention include articles made by all the various extrusion processes. Such articles may be used in automotive and other transportation devices, building and construction, household and garden appliances, power tool and appliance and electrical supply housing, connectors, and aircraft as acoustic systems for sound absorption and insulation. The materials are especially suited to applications where, in addition to meeting the relevant acoustic performance standards, they must also meet any applicable fire test codes, for example office partitions, automotive decouplers, domestic appliance sound insulation, and sound proofing panels and machine enclosures. The ability to pass the US FMVSS 302 (auto) test, have a US Underwriter's Laboratory UL 94 rating of HF1, and a B1 rating under German norm DIN 4102 are some of the goals that may be achieved with the present invention.

The foams of the present invention have excellent acoustic absorption capabilities. One way to measure the ability to absorb sound is to measure the acoustic absorption coefficient of the foam according to ASTM E1050 at sound frequencies of 250, 500, 1000 and 2000 Hz and then calculate the arithmetic average of those sound absorption coefficients. When that determination is made with the foams of the present invention, the average sound absorption coefficient is greater than 0.15, preferably greater than 0.20, more preferably greater than 0.25, even more preferably greater than 0.30. Thus the foams of this invention are useful for absorbing sound in the range from 250 to 2000 Hz such that the sound absorption capability is equivalent to the foregoing preferred average sound absorption coefficients. For example, the foam may be located in the presence of a sound intensity of at least 50 decibels, such as on a vehicle equipped with a combustion engine. Unexpectedly, foams of the present invention have a peak absorption coefficient of at least 0.5 within a frequency range of 250 to 1000 Hz, for foams having a thickness within a range of from 10 mm to 100 mm.

Another advantage of the foam of the present invention is that the high average sound absorption coefficient may be achieved with a low water absorption. That is desirable to help limit corrosion of proximate metal parts, to avoid the growth of bacteria and mold, and to improve thermal insulation value where that is needed. The inventive foam preferably does not absorb more than 10 percent water by volume, 5 percent water by volume, 3 percent water by volume, more preferably not more than 1.5 percent water by volume, and even more preferably not more than 1 percent water by volume, when measured according to European Norm (EN) 12088 at a 50° C. temperature gradient between a warm, water-saturated atmosphere and the foam (the latter of which is maintained at a temperature at or below about 0° C. in order to condense the water onto the surface of the foam sample) based on a test period of 14 days exposure.

The foregoing list merely illustrates a number of suitable applications. Skilled artisans can readily envision additional applications without departing from the scope or spirit of the present invention.

The following examples illustrate, but do not in any way limit the scope of the present invention.

EXAMPLES

Materials Used to Prepare the Foams of the Examples
1. LDPE 1 is a low density polyethylene (LDPE) resin with a density of 0.924 g/cm3 and melt index of 0.88 dg/min (according to ASTM D1238, 190° C./2.16 kg).
2. LDPE 2 is which is a low density polyethylene (LDPE) with a density of 0.924 g/cc and melt index of 0.8 dg/min (according to ASTM D1238, 190° C./2.16 kg) and is commercially available as LDPE 300R from the Dow Chemical Company.
3. LDPE 3 is commercially available as LDPE 400R which is a low density polyethylene (LDPE) with a density of 0.925 g/cc and melt index of 1.0 dg/min (according to ASTM D1238, 190° C./2.16 kg) and available from the Dow Chemical Company.
4. LDPE 4 is commercially available as LDPE 620i which is a low density polyethylene (LDPE) with a density of 0.924 g/cc and melt index of 1.8 dg/min (according to ASTM D1238, 190° C./2.16 kg) and available from the Dow Chemical Company.
5. HMS PP 1 is commercially available as Profax PF814 which is a high melt strength polypropylene with a melt index of 3 dg/min (according to ASTM D1238, 230° C./2.16 kg) and available from Montell Polyolefins.
6. PE-68™ is a brominated fire retardant having 68 wt percent bromine content (tetrabromobisphenol A bis (2,3-dibromopropyl ether) (used as a 30 percent concentrate in LDPE) and is a trademark of and available from the Great Lakes Chemical Corporation.
7. CHLOREZ™ 700 is a chlorinated paraffin containing 71.5 wt percent chlorine and is a trademark of and available from the Dover Chemical Corporation.
8. TRUTINT™ 50 is antimony trioxide synergist, Sb2O3, of average particle size of 3.0 microns, respectively (used as an 80 percent concentrate in LDPE) and is a trademark of and available from the Great Lakes Chemical Corporation.

9. TMS™ is antimony trioxide ($Sb_2O_3$) synergist having an average particle size of 1.5 microns (used as an 80 percent concentrate in LDPE) and is a trademark of and available from the Great Lakes Chemical Corporation.
10. MICROFINE™ AO-3 is antimony trioxide ($Sb_2O_3$) synergist having an average particle size of 0.3 microns (used as an 80 percent concentrate in LDPE) and is a trademark of and available from the Great Lakes Chemical Corporation.
11. NYACOL™ DP-6215 is antimony pentoxide synergist of average particle size 0.03 microns (used as a concentrate in high melt flow PP) and is a trademark of and available from Nyacol Nano Technologies, Inc.
12. IRGANOX™ 1010 is a phenolic antioxidant/stabilizer and is a trademark of and available from Ciba Specialty Chemicals
13. ULTRANOX™ 815A is a phenolic/phosphite antioxidant/stabilizer and is a trademark of and available from GE Specialty Chemicals
14. ATMER™ 129 and 1013 are glycerol mono stearate, a permeability modifier/cell size enlarger, and is a trademark of and available from ICI Americas
15. PLASBLAK™ PE3037 is a 25 percent carbon black concentrate (pigment) in LDPE resin and is a trademark of and available from Cabot Plastics International
16. 50 BK 70 is a 25 percent carbon black concentrate (pigment) compounded in LDPE resin and custom made by M.A. Hanna Inc.

Tests for the examples below were conducted by extruding the formulations specified in the respective Tables 1 to 5 on an extrusion line. The extrusion line consists of a single screw extruder with a feeding zone for resins and solid additives, a melting zone, and a metering zone. In addition, there is a mixing zone with a port for injecting blowing agents and liquid additives and a cooling zone to uniformly cool the melt to the foaming temperature. The foaming temperature is the optimal gel temperature for foaming when the melt strength is high enough to stabilize the foam and prevent cell collapse. The line also consists of a gear pump between the metering and mixing zones to stabilize the melt flow and a static mixer in the cooling zone to aid in gel temperature uniformity. The melt is extruded through a die to ambient temperature and pressure to expand the gel to the desired shape and stabilize the foam.

Example 1

The following example illustrates the effect of particle size of an additive (antimony trioxide, synergist) on the cell size of the resulting foam. The example also details fire retardant formulations to prepare PP/PE blend acoustical foams of the invention and methods of preparing such foams by the extrusion process. The foams listed in Table 1 were prepared in standard extrusion equipment. The levels of the additives used in the formulation (irrespective of whether they are fed as powders or as concentrates) are reported in phr. The level of blowing agent used in the formulation is reported in parts by weight per hundred parts by weight of the total feed (polymer and additives) (pph).

The comparative formulation 1 in Table 1 was run with a 60 percent/40 percent blend (by weight) of HMS PP 1 and LDPE 1; with the following additives: 0.5 phr Irganox 1010, 0.2 phr Ultranox 815A, 0.5 phr Atmer 129 GMS, 0.4 phr 50 BK 70 carbon black, 5 phr PE-68 brominated fire retardant and 0.5 phr antimony trioxide synergist. The level of isobutane blowing agent was 6.5 pph. The antimony trioxide concentrate was prepared by mixing 7.5 percent by weight (wt %), based on concentrate weight GMS and 30 wt % 3.0µ TRUTINT-50 grade of $Sb_2O_3$ in a Henschel mixer and compounding with 62.5 wt % LDPE 4 in a twin screw extruder. The temperature and pressure profile used for the PP/PE blend foam was similar to that used for standard PP foam, except for the die pressure that was maintained as low as possible, close to the prefoaming limit. The highest gel temperature in the line was at the mixer (225° C.) and the highest gel pressure was at the gear pump (1780 psi). The foaming temperature was 152° C.

Using the same line conditions, the same formulation was run with a new $Sb_2O_3$ concentrate at the same loading (PE-68 to $Sb_2O_3$ ratio of 5 phr:0.5 phr) as Example 1a of the present invention and at twice the loading (PE-68 to $Sb_2O_3$ ratio of 5 phr:1 phr) as Example 1b of the present invention. This concentrate was prepared by compounding 80 wt % 0.3µ MICROFINE AO-3 grade of $Sb_2O_3$ (treated by physical processing) with 20 wt % LDPE 4 in a twin screw extruder. The results are summarized in Table 1 below.

TABLE 1

| Example* | Base resins and wt. Ratio | Fire retardant | | Flame retardant synergist | | Ave. cell size |
|---|---|---|---|---|---|---|
| Control 1 | HMS PP 1:LDPE 1 = 60:40 | PE-68 | 0 phr | n/a | 0 phr | 7.5 mm |
| Comp. 1 | HMS PP 1:LDPE 1 = 60:40 | PE-68 | 5 phr | TRUTINT 50 | 0.5 phr | 1.5 mm |
| 1a | HMS PP 1:LDPE 1 = 60:40 | PE-68 | 5 phr | MICROFINE AO-3 | 0.5 phr | 10.2 mm |
| 1b | HMS PP 1:LDPE 1 = 60:40 | PE-68 | 5 phr | MICROFINE AO-3 | 1 phr | 8.8 mm |

*Other ingredients in each Example formulation:
Irganox1010: 0.5 phr, Ultranox 815A: 0.2 phr, Atmer 129: 0.5 phr, 50 BK 70 carbon black: 0.375 phr, isobutane as blowing agent: 6.5 pph The Control 1 formulation with no FR package was run initially and the cells were large (average cell size: 7.5 mm). After the Comparative Example 1 fire retardant had purged through the line, the average cell size decreased significantly to 1.5 mm because of nucleation induced by the 3 micron $Sb_2O_3$ particles.

The average cell size dramatically increased to 10.2 mm after the Example 1a MICROFINE 0.3 micron particle size concentrate had purged through the line. The average cell size stabilized at 8.8 mm after the Example 1b MICROFINE 0.3 micron particle size concentrate at higher loading had purged through the line. Thus, the use of the sub-micron grade of $Sb_2O_3$ in the formulation increased the average cell size of the foam and permitted higher loading of the fire retardant synergist for improved fire retardancy.

Example 2

The following example illustrates the effect of particle size of an additive (antimony trioxide, synergist) on the cell size of the resulting foam. The example also details fire retardant formulations to prepare PE acoustical foams of the invention and methods of preparing such foams by the extrusion process. The foams listed in Table 2 were prepared in standard extrusion equipment.

Comparative Example 2 contains 100 wt % LDPE 2 with the following additives: 0.3 phr Irganox 1010; 1.0 phr Atmer 1013 GMS; 11 phr of PE-68 brominated FR; 1.3 phr of 3µ Trutint 50 $Sb_2O_3$ and 0.375 phr of 25 wt % Plasblak PE3037carbon black. The level of isobutane blowing agent was 8.3 pph. The temperature and pressure profile used was the same as that used for standard polyethylene foam, except for the die pressure that was maintained as low as possible, close to the prefoaming limit. The highest gel temperature in the line was at the extruder (192° C.) and the highest gel pressure was at the gear pump (122 bar). The foaming temperature was 111° C.

Using similar line conditions, a comparable formulation with 0.8 phr Atmer 1013 GMS and 9.0 pph isobutane was run with a new $Sb_2O_3$ at a higher loading of 2 phr as Example 2A of the present invention. This concentrate was prepared by compounding 80 wt % 0.3µ MICROFINE AO-3 grade of $Sb_2O_3$ (treated by physical processing) with 20 wt % LDPE 4 (based on concentrate weight) in a twin screw extruder. In this case, the highest gel temperature in the line was at the extruder (185° C.) and the highest gel pressure was at the gear pump (117 bar). The foaming temperature was 112° C.

Again using the same line conditions, the Example 2B formulation was run with a higher loading of 3 phr $Sb_2O_3$.

The results obtained with the above examples are summarized in Table 2 below.

limited to 1.3 phr to achieve foam with cell size of >6 mm. At higher levels of $Sb_2O_3$, the foam had unacceptably small cell size and marginal acoustical activity.

The Control 2b formulation with no FR package was run initially and the cells were large (average cell size: >10 mm). The average cell size of the foam stabilized at 9.1 mm after the 0.3 micron MICROFINE AO-3 concentrate of Example 2A had purged through the line.

When the 0.3 micron MICROFINE AO-3 concentrate of Example 2B had purged through the line, the average cell size of the foam stabilized at 7.7 mm Thus, the use of the sub-micron grade of $Sb_2O_3$ in the formulation significantly reduced the nucleation potential of the synergist and permitted higher loading for improved fire retardancy.

Example 3

The following example illustrates the effect of particle size of an additive (antimony oxide, synergist) on the cell size of the resulting foam. The foams listed in Table 3 were prepared in standard extrusion equipment.

A 60%/40% blend (by weight) of HMS PP 1 and LDPE 4, 0.3 phr Irganox 1010; 0.5 phr Atmer 129 GMS; 5 phr PE-68 brominated FR; 1 phr TRUTINT 50 grade $Sb_2O_3$ (3.0µ) and 8 pph isobutane were combined in an extruder to make Comparative Example 3. The temperature and pressure profile used was the same as that used for standard polypropylene foam, except for the die pressure that was maintained as low as possible, close to the prefoaming limit.

The 3.0µ $Sb_2O_3$ was replaced at the same antimony loading with the sub-micron MICROFINE AO-3 grade (0.3µ) to make Example 3A of the present invention.

TABLE 2

| Example* | Base resin | Fire retardant | Flame retardant synergist | | Ave. cell size |
|---|---|---|---|---|---|
| Control 2a* | LDPE 2 | PE-68 | 0 phr n/a | 0 phr | >10 mm |
| Comp. 2* | LDPE 2 | PE-68 | 11 phr TRUTINT 50 | 1.3 phr | 7.7 mm |
| Control 2b** | LDPE 2 | PE-68 | 0 phr n/a | 0 phr | >10 mm |
| Ex 2A** | LDPE 2 | PE-68 | 11 phr MICROFINE AO-3 | 2 phr | 9.1 mm |
| Ex 2B** | LDPE 2 | PE-68 | 6 phr MICROFINE AO-3 | 3 phr | 7.7 mm |

*Other ingredients in each Example formulation:
Irganox-1010: 0.3 phr, Atmer 1013 GMS: 1.0 phr, Plasblak PE-3037 carbon black: 0.375 phr, isobutane as blowing agent: 8.3 pph
**Other ingredients in each Example formulation:
Irganox-1010: 0.3 phr, Atmer 1013 GMS: 0.8 phr, Plasblak PE-3037 carbon black: 0.375 phr, isobutane blowing agent: 9.0 pph The Control 2a formulation with no FR package was run initially and the cells were large (average cell size: >10 mm). After the Comparative Example 2 fire retardant was purged in, the cells became smaller because of nucleation induced by the 3 micron $Sb_2O_3$ particles. The $Sb_2O_3$ level had to be The 0.3µ $Sb_2O_3$ was replaced at the same antimony loading with the nano-sized NYACOL grade $Sb_2O_5$ (0.03µ) to make Example 3B.

The formulations and results are summarized in Table 3 below.

TABLE 3

| Example* | Base resins and ratio | Fire retardant | Flame retardant synergist | | Ave. cell size |
|---|---|---|---|---|---|
| Comp. 3* | HMS PP 1:LDPE 4=60:40 | PE-68 | 5 phr TRUTINT 50 | 1 phr | 4.5 mm |
| Ex 3A* | HMS PP 1:LDPE 4=60:40 | PE-68 | 5 phr MICROFINE AO-3 | 1 phr | 5.4 mm |
| Ex 3B* | HMS PP 1:LDPE 4=60:40 | PE-68 | 5 phr NYACOL DP-6215 | 1 phr | 6.2 mm |

*Other ingredients in each Example formulation:
Irganox-1010: 0.3 phr, Atmer 129 GMS: 0.5 phr, isobutane as blowing agent: 8.0 pph The foam of Example 3A had an average cell size of 5.4 mm, which represents an improvement in average cell size over Comparative Example 3.

The foam of Example 3B with even smaller particle size had an average cell size of 6.2 mm, which is comparable to the Control 3 formulation with no synergist.

The results show that as the particle size of the inorganic additive is decreased below one micron, the nucleation propensity surprisingly reduces, resulting in foam with larger cell size.

Example 4

100 wt % LDPE 3; 0.1 phr Irganox 1010; 0.2 phr Atmer 129 GMS; 0.3 phr Plasblak PE3037 carbon black; 4.1 phr PE-68 brominated FR; 2 phr TMS grade Sb2O3 (1.5μ); 2 phr Chlorez 700 chlorinated FR and 9 pph isobutane were combined to make Comparative Example 4A. The temperature and pressure profile used was the same as that used for standard polyethylene foam, except for the die pressure that was maintained as low as possible, close to the prefoaming limit. The resulting foam had an average cell size of 6.3 mm.

The Sb2O3 was replaced by the larger particle size TRUTINT 50 grade (3.0μ) at a higher level, 2.3 phr, without the chlorowax to make Comparative Example 4B. The resulting foam had an average cell size of 7.1 mm.

The results are summarized in Table 4 below.

TABLE 4

| Example* | Base resin | Fire retardant | Flame retardant synergist | | Ave. cell size |
|---|---|---|---|---|---|
| Comp. 4A | LDPE 3 | PE-68 Chlorez-700 | 4.1 phr TMS (1.5μ) 2 phr | 2 phr | 6.3 mm |
| Comp. 4B | LDPE 3 | PE-68 | 4.1 phr Trutint-50 (3.0μ) | 2.3 phr | 7.1 mm |

*Other ingredients in each Example formulation:
Irganox-1010: 0.1 phr, Atmer 129 GMS: 0.2 phr, Plasblak PE-3037 carbon black: 0.3 phr, isobutane: 9.0 pph Example 5

A 60 percent/40 percent blend (by weight) of HMS PP 1 and LDPE 3; 0.1 phr Irganox 1010; 0.3 phr Plasblak PE3037 carbon black; 3 phr PE-68 brominated FR; 1 phr TMS grade Sb2O3 (1.5μ); 1 phr Chlorez 700 chlorinated FR and 10 pph isobutane were combined to make Comparative Example 5A. The temperature and pressure profile used was the same as that used for standard polypropylene foam, except for the die pressure that was maintained as low as possible, close to the prefoaming limit. The resulting foam had an average cell size of 3.6 mm.

The Sb2O3 was replaced by the larger particle size TRUTINT 50 grade (3.0μ) at the same level, 1 phr, without the chlorowax to make Comparative Example 5B. The resulting foam had an average cell size of 6.5 mm.

The results are summarized in Table 5 below.

TABLE 5

| Example* | Base resins and ratio | Fire retardant | Flame retardant synergist | | Ave. cell size |
|---|---|---|---|---|---|
| Comp. 5A | HMS PP 1:LDPE 3=60:40 | PE-68 CHLOREZ-700 | 3 phr TMS (1.5μ) 1 phr | 1.0 phr | 3.6 mm |
| Comp. 5B | HMS PP 1:LDPE 3=60:40 | PE-68 | 3 phr TRUTINT-50 (3.0μ) | 1.0 phr | 6.5 mm |

*Other ingredients in each Example formulation:
Irganox-1010: 0.3 phr, Plasblak PE3037 carbon black: 0.3 phr, isobutane: 10.0 pph As can be seen from the above data, an increase in flame retardant synergist average particle size resulted in an increase in average cell size. This data confirms the expected result, namely that a decrease in particle size is expected to decrease the average cell size for a given weight percent concentration of the synergist. That is in contrast to the unexpected increase in average cell size shown in Table 2, for example.

As can be seen from the above data, an increase in flame retardant synergist average particle size resulted in an increase in average cell size. This data confirms again the expected result, namely that a decrease in particle size is expected to decrease the average cell size for a given weight percent concentration of the synergist. That is in contrast to the unexpected increase in average cell size shown in Table 3, for example.

Example 6

100 wt % LDPE 3; 0.3 phr Atmer 1013 GMS; 1 phr TMS grade Sb2O3 (1.5μ) and 10 pph isobutane were combined to make Comparative Example 6A. The temperature and pressure profile used was the same as that used for standard polyethylene foam, except for the die pressure that was maintained as low as possible, close to the prefoaming limit. The resulting foam had an average cell size of 2.7 mm.

The Sb2O3 was replaced by the larger particle size TRUTINT 50 grade (3.0μ) at the same level, 1 phr, to make Comparative Example 6B. The resulting foam had an average cell size of 3.2 mm.

The results are summarized in Table 6 below.

TABLE 6

| Example* | Base resin | Fire retardant | Flame retardant synergist | | Ave. cell size |
|---|---|---|---|---|---|
| Comp. 6A | LDPE 3 | PE-68 | 0 phr TMS (1.5μ) | 1 phr | 2.7 mm |
| Comp. 6B | LDPE 3 | PE-68 | 0 phr Trutint-50 (3.0μ) | 1 phr | 3.2 mm |

*Other ingredients in each Example formulation:
Atmer 1013 QMS: 0.3 phr, isobutane as blowing agent: 10.0 pph As can be seen from the above data, an increase in flame retardant synergist average particle size resulted in an increase in average cell size. This data confirms the expected result, namely that a decrease in particle size is expected to decrease the average cell size for a given weight percent concentration of the synergist. That is in contrast to the unexpected increase in average cell size shown in Table 1, for example.

The invention claimed is:

1. A cellular polymer foam having an average cell size according to ASTM D3575 of at least 1.5 mm, the foam containing at least one flame retardant adjuvant, wherein the flame retardant adjuvant has an average particle size of not greater than 0.3 micron and is present in an amount ranging from 0.5 to 6.0 parts by weight per hundred parts by weight of polymer, and wherein the polymer is a thermoplastic polymer selected from α-olefin polymers, vinyl aromatic polymers, ethylene-styrene interpolymers, and combinations thereof.

2. The polymer foam of claim 1, wherein the flame retardant adjuvant comprises an oxide of antimony.

3. The polymer foam of claim 1 further comprising a flame retardant.

4. The polymer foam of claim 3, wherein the flame retardant is a halogen-containing organic compound.

5. The polymer foam of claim 1 having not more than 30 percent crosslinking after 10 days aging.

6. The polymer foam of claim 1, wherein the polymer comprises at least 50 weight-percent polypropylene.

7. The polymer foam of claim 1, wherein the polymer foam has at least one surface, the at least one surface having defined therein a multiplicity of perforation channels extending from the at least one surface into the foam such that there is an average of at least one perforation channel per 10 square centimeters of the at least one surface.

8. The polymer foam of claim 2, wherein the polymer foam further comprises a halogen-containing organic compound as a flame retardant in an amount which provides from 1 to 6 moles halogen contributed by the halogen-containing organic compound per mole antimony provided by the flame retardant adjuvant.

9. The polymer foam of claim 1 having an average cell size of at least 4 mm measured according to ASTM 3575.

10. The polymer foam of claim 9, wherein the polymer is a thermoplastic polymer comprising at least 50 weight-percent polypropylene.

11. The polymer foam of claim 1, wherein the polymer is an α-olefin polymer.

12. The polymer foam of claim 1, wherein the flame retardant adjuvant comprises one or more of a metal oxide, zinc borate, antimony silicate, zinc stannate, zinc hydroxystannate, or a ferrocene.

13. The polymer foam of claim 12, wherein the flame retardant adjuvant is present in an amount ranging from 1.0 to 6.0 parts by weight per hundred parts by weight of polymer resin.

14. The polymer foam of claim 12, wherein the flame retardant adjuvant is present in an amount ranging from 0.5 to 3.0 parts by weight per hundred parts by weight of polymer resin.

15. The polymer foam of claim 12, wherein the flame retardant adjuvant is present in an amount ranging from 1.0 to 3.0 parts by weight per hundred parts by weight of polymer resin.

* * * * *